United States Patent [19]

Kawashima

[11] Patent Number: 5,196,243
[45] Date of Patent: Mar. 23, 1993

[54] PRINTED MATTER

[76] Inventor: Kiyoharu Kawashima, 5-7, Esaka-cho 5-chome, Suita-shi, Osaka-fu, Japan

[21] Appl. No.: 837,709

[22] Filed: Feb. 21, 1992

Related U.S. Application Data

[63] Continuation-in-part of Ser. No. 211,038, Jun. 24, 1988, abandoned, which is a continuation-in-part of Ser. No. 83,251, Aug. 10, 1987, abandoned.

[51] Int. Cl.$^5$ .................................................. B44F 1/10
[52] U.S. Cl. .......................................... 428/29; 106/21; 283/90; 427/145
[58] Field of Search ............................. 283/95; 106/21; 427/145; 428/29, 191

[56] References Cited

U.S. PATENT DOCUMENTS

| | | | |
|---|---|---|---|
| 4,162,164 | 7/1979 | Lin | 106/21 |
| 4,171,982 | 10/1979 | Lin | 106/21 |
| 4,188,431 | 2/1980 | Sokol et al. | 428/29 |
| 4,198,445 | 4/1980 | Sokol et al. | 427/145 |
| 4,490,177 | 12/1984 | Shioi et al. | 106/23 |

OTHER PUBLICATIONS

Derwent Abstract Acc. No. 86-04444 Aug. 1907, Japanese Pat. No. 560141770, Jul. 26, 1985.
Claims file Abstract, U.S. Pat. No. 3001947, Sep. 26, 1961.
Derwent Abstract Acc. No. 75-66629w/40, Japanese Patent No. 75027846, Sep. 10, 1975.
Derwent Abstract Acc. No. 88-213074/31, Australian Patent No. 8781808, Jun. 9, 1988.
Derwent Abstract Accession No. 85-321685/51, Kawashima, Japanese Patent Nov. 11, 1985.
Derwent Abstract Accession No. 84-291408/47, Japanese Patent No. J59179572, Oct. 12, 1984.
Derwent Abstract Accession No. 86-044448/07, Japanese Patent No. J60141770, Jul. 26, 1985.
Derwent Abstract Accession No. 87-012235/02, Japanese Patent No. J61271361, Dec. 1, 1986.

*Primary Examiner*—Amelia Burgess Yarbrough
*Attorney, Agent, or Firm*—Stevens, Davis, Miller & Mosher

[57] ABSTRACT

Printed matters are disclosed, which are printed with the coloring ink that is able to do the short-time fading at which time the color is losen of itself in a relatively short time after once having developed color by interacting with the coloring assistant containing the pH-adjusting agent which loses effect with the passage of time due to the volatility or the desiccation, and further that is able to redevelop color and repeat the above-mentioned short-time fading each time when the above-mentioned coloring assistant is made to act thereon a plural number of times; and which printed matters are suitably used for printing invisibly, for example, the spaces for answers being to stand abreast of the visibly printed spaces for questions in question books.

8 Claims, 1 Drawing Sheet

Question 1. Write the English language translation of each of the following Chinese characters which are marked with a line.

Question 1. Write the English language translation of each of the following Chinese characters which are marked with a line.

PRINTED MATTER

REFERENCE TO RELATED APPLICATIONS

This application is a Continuation-in-part of Ser. No. 07/211.038, filed Jun. 24, 1988, now abandoned which in turn is a Continuation-in-part of Ser. No. 07/083,251, filed Aug. 10, 1987, now abandoned.

BACKGROUND OF THE INVENTION

This invention relates to printed matters being printed by the use of such a kind of ink as containing pH indicator for its ingredient, hereinafter referred to as "coloring ink" which ink is able to develop color under the action of a coloring assistant and to lose color in a short time with the passage of time, and, if necessary, it can be made respectedly, to develop color and lose color any number of times.

As printed matters where their printed parts being printed invisibly ahead of time are made to become visible by applying some liquid agent thereto with painting means such as, for example, a pen or a brush, there have been heretofore proposed such kinds of things as disclosed in Japanese Utility Model Publication No. 52063 of 1981, and further various contrivances regarding painting means or printing inks are described, for example, in Japanese Patent Application Disclosure No. 135720 of 1976, and others.

However, conventional ones as, for example, in the above Utility Model Publication No. 52063 of 1981 contain zinc chloride for preventing the coloring from growing weak with the passage of time and in the end losing color, and thereby are so contemplated only that after the invisible printed part once develops color, the coloring remains as permanently as possible, but there is no thought at all that the coloring is permitted to lose of its own accord, in a short time after developing color. Therefore, in such printed matters as study books or question books having spaces for notes serving as spaces for answers printed abreast of spaces for questions, the coloring of the spaces for notes lasts for long hours after once having developed color visibly, even when the above spaces for notes have been printed as color-developable but invisible parts. As the results, it becomes impossible to procecute one's learning repeatedly solving the questions by returning the spaces for notes to a state of blank any number of times.

Consequently, such ones as above, in order to solve problems in a plural number of times without seeing the space for answers, is required like printed matters printed using only conventional visible inks to have the space for answers and others printed in the end of a book or in its marginal spaces or in a separate volume. Accordingly, it takes time and labor to compare questions and answers or explanations from one to another, thereby leading to the lowering of the efficiency of learning.

Of course among conventional ones, not that there is not such a one where the efficacy of ink dies away under the influence of ultraviolet rays, oxidation, etc., in company with which the colored printed part loses color of itself when being left alone for long hours, for example, in about several days, say, in about 3 days, but it is substantially impossible for such a conventional one as above to prosecute the repetition of learning able to enhance the efficiency of study by losing the color of the space for answers in a short time, that is, in a minute to 12 hours, preferably in about 2 to 10 minutes, in as much as it is required long time more than several days for its fading.

Further, conventional ones have no intention from the first to develop color and to lose color over and over again, and consequently they are hard to be used repeatedly.

SUMMARY OF THE INVENTION

This invention has for its object the provision of printed matters which are able to develop color and to lose color as well under the action of some coloring assistant.

This invention has for its object also the provision of printed matters in which the color-losing can be done in a short time.

Further, this invention has for its object the provision of printed matters which is able to perform the repetition of the coloring and facing.

DETAILED DESCRIPTION

Figure 1A:
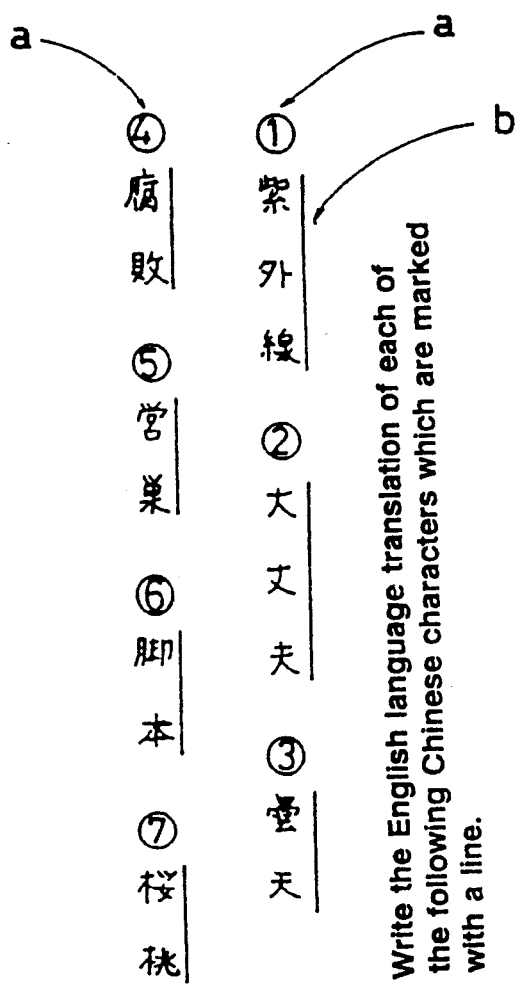
FIG. 1(a) is a top view showing a part of the content of a printed matter according to the invention.

This invention relates to printed matters produced by printing the whole or part of a printed body by the use of some kind of coloring ink which can do a short-time facing, losing color of its own accord in a relatively short time after developing color by interacting with coloring assistant losing the effect with the passage of time through volatilization or desiccation, and further can repeat the color-redeveloping each time when the above coloring assistant acts thereon a plural number of times and do the above short time fading over again. The above-mentioned coloring ink has for its ingredient a mixture of one or plural sorts of such pH-indicators as follows: $\gamma$-dinitrophenol, m-nitrophenol, o-nitrophenol, p-nitrophenol, cyanine, $\alpha$-naphtholphthalein, phenolphthaleij, cresolphthalein, thymolphthalein, ethyl bis-acetic acid, and Bromophenol purple. And in this invention, phthalein pH-indicators are used.

Incidentally, these pH-indicators have the pH-ranges as becomes colorless, and can be used properly depending on colors to be represented. By the way, the printed matters according to the invention are produced using such coloring ink as having within themselves the pH-indicator such as mentioned above or a mixture of plural sorts of them (hereinafter referred to only as "pH-indicators"). These pH-indicators have the pH-ranges developing color in the direction of higher pH-value (that is, to the alkali side).

The coloring ink is usually adjusted to a colorless state, as mentioned above. It may be prepared so as to become colorless through the desiccation after being printed through colored at the outset. It can be also prepared by dissolving pH-indicators by the use of, for example, alkaline solution or solvent of alcohol, and by kneading an ink vehicle into the above dissolved liquid. In this connection, there are used as ink vehicles water-holding agents such as polyhydric alcohol, surface active agents, oils, and various kinds of resins as occasion demands. Further, as resins, there can be used resin, shellac, guaiac gum, methyl cellulose, ethylcellulose, and the like, which all work as thickeners.

On the other hand, the coloring ink can be also prepared by kneading pH-indicators into ink vehicles after these pH-indicators are ground into fine grains instead of dissolving them by solvent. Otherwise, the pH-indicators can be kneaded with ink vehicles after the pH-indicators are made to be adsorbed to suitable powders, inorganic or organic, etc.

The coloring ink can be made to contain acidic pH-indicating agents. These pH-adjusting agents are used for keeping pH-indicators in the colorless pH-range. They are also used for continuing to hold pH-indicators in the colorless pH-range even after making alkaline coloring assistants repeatedly act thereon. To this end, there are used as pH-adjusting agents such as tartaric acid or citric acid having the lasting efficacy.

The printed parts being printed with such kinds of coloring ink develop color while letting coloring assistants act thereon, and lose color in a short time after coloring.

The above-mentioned coloring assistants contain the alkaline pH-adjusting agents.

There can be used as pH-adjusting agents also such ones as losing the efficacy with the passage of time after being printed on the printed parts. This losing effect with the passage of time results from the volatilization of alkaline substance itself or from the evaporation of the solvent (chiefly, water) dissolving the alkaline substance. This losing effect occurs under the ordinary living conditions.

By way of examples of alkaline substances losing effect through the volatilization, there can be exemplified the following: ammonia, monoethanol amines, a class of propyl amines, 2-ethylhexy-loxypropyl amine, 3-ethoxypropyl amine, 3-methyoxypropyl amine, diisobutyl amine, sec-butyl amine, a class of isopropanol amines, a class of ethanol amines, 2-ethylhexyl amine, a class of ethylene amine, and such like.

The losing effect of coloring assistants being based on the drying of water becomes possible through the utilization of the extinguishment of the ion dissociation power. There are many pH-adjusting agents having such properties, but in practice it is hard for them to make water be completely dried, so that there are being usually employed the ones losing the ion dissociation power as A result that their concentration go beyond a certain value. By way of some examples of alkaline substances of such kinds, there are exemplified diisopropanol amine, triisopropanol amine, diethanol amine, and such like. As solvents for mixing these alkaline substances, there are used water, alcohols, polyhydric and others. These alkaline pH-adjusting agents may be used as a mixture of plural sorts of them.

The coloring assistants which are applied to printed part make the pH-indicators contained in the coloring ink develop color, and the pH-indicators loses color in proportion to the losing effect of the coloring assistants with the passage of time. With the object of bringing the color fading to perfection, some involatile acidic substance can be added to the coloring assistants. Further, some volatile acidic substances which lose effect later than the above-mentioned alkaline pH-adjusting agents also can be added thereto. However, the ones which react neutrablly to the above alkaline pH-adjusting agents and thereby generate the deposit are unsuitable. As is well known in the art, the aforementioned tartaric acid and citric acid are available as the involatile substance and acetic acid and formic acid are available as the volatile acidic substance.

Sorts and concentrations of the coloring assistants are decided depending on the pH-values at which the pH-adjusting agents develop color.

The time which is required after coloring until to facing is to be adjusted so that the color may be losen in a short time of 1 minutes to 12 hours, preferably 2 to 15 minutes, particularly in the case of being applied to the spaces for notes in teaching materials. It is not desirable that the coloring last long to continue until the next exercise.

The above-mentioned time required after coloring until fading can be adjusted depending on the content both of the coloring ink and of the coloring. assistants. As for the coloring ink it can be adjusted by the sorts of pH-indicators, the sorts and concentrations of surface active agents or the concentrations of oils which are contained in the ink vehicles, and further the sorts and concentrations of the aforesaid involatile acidic substances. Speaking of the coloring assistants, they are adjusted according to their evaporation speed and the desiccation speed.

The printed parts, after losing color in a short time, develop color again by making the coloring assistant act thereon, and then lose color in a short time. The coloring and fading in such a manner is possible to be repeated any number of times.

This repeatability are associated with the clearness at the time of coloring. The clearness is elevated as the number of repeating times increases, but this clearness is decided by the adjustment of the coloring ink, the adjustment of the coloring assistants, and the selection of the quality of paper used.

The higher both the concentration of the coloring agents contained in the coloring ink and the hydrophile property of it owing to the surface active agents are, it is possible to more enhance the clearness of coloring and accordingly to increase the number of repeating times.

The circumstance that the coloring is clear in the initial stage lightens the degradation of color after repeating the action a plural number of times. Consequently, the clearness contributes to the elevation of the number of repeating times. The number of repetition can be elevated by the concentrations and sorts of the alkaline pH-adjusting agents in the coloring assistant, and further by the adjustment of the concentration of the aforesaid involatile acidic substance.

Incidentally, by adding some involatile acidic substance to the ink vehicle, it is possible to bring the color-losing property after the action of the coloring assistant to perfection. The perfection of color-losing referred to here means a color-losing state of a degree hardly detectable with the naked eye under the fluorescent lamp of about 10W per area of 1.6 $m^2$ in the interior of an ordinary room. Incidentally, the addition of the involatile acidic substance contributes both to the perfection of losing color and to the shortening of the time required after coloring until fading to be sure, but the amount of its addition need to be compounded optimally so as not to damage the repeating activity.

As for the paper used as the printed boy, its color-losing time, its repeatability, its clearness, and the certainty of its fading vary depending on the quality of paper (its pH-value, water-absorbing property). Therefore, it is necessary to choose an optimum quality of paper corresponding to the coloring ink and the coloring assistants.

As described above, the printed matters according to the invention comes to obtain both the property of losing color in a short time that the color is losen in about 2 to 15 minutes after developing color at 20° C., 65% and the characteristic suitable for teaching materials and rarely to be seen in any conventional printed matters, whereby the printed matters according to the invention can be made to be reused practically and repeatedly 10 times at the minimum, on the basis of the selection of all conditions such as the adjustment in the coloring ink, the adjustment of the coloring assistants, the choice of the quality of paper, and others.

By the way, the time required after coloring until fading is possible to be adjusted optionally between from 1 minute to 12 hours in reply to various purposes.

There are given in Table 1 several examples of the combinations of pH-indicators and coloring assistants which are used in the printed matters according to the invention. There are also given that the pH-values at which the pH-indicators develop color, namely, the coloring pH; the pH-values at which they lose color, namely, the fading pH; the sorts of colors; and the approximate values of the time required from having developed color by the addition of the coloring assistants until having losen color of themselves. The coloring pH is a value of concentration at which the printed parts become recognizable or legible easily with a person's eye under the action of the coloring assistants. In this case, the time required from coloring till fading can be adjusted, as mentioned above. Incidentally, the coloring ink can contain as the texture of its vehicle denatured alcohol, 75 parts; water, 15 parts; surface active agent, 10 parts; and tartaric acid 0~10 parts; and methyl cellulose, 2 parts.

In this connection, the time values shown in the last column of Table 1 exemplify each of the cases where the printing has been done with the coloring agents-containing ink having within itself the pH-indicators of the amounts equivalent to the amounts of addition listed in Table 1.

But in using such coloring inks in actual printing, there are problems in the aspects of printing facility, printing quality, color changing with the passage of time, and stability of developing color effect and losing color effect.

In this invention, those problems are solved by using ink vehicles in which citric acid and rust preventives are put into the basic material consisting of surface active agent, alkylolamide and water. In a preferred embodiment, the ratio composition of this coloring ink is:
  the phthalein pH-indictor is from 5 to 20 weight %,
  the surface active agent is from 8 to 20 weight %,
  the alkylolamide is from 10 to 26 weight %,
  the citric acid is from 0.12 to 2 weight %,
  the rust preventives are from 0.12 to 2 weight %,
  and water as remainder.

In this invention, the alkylolamine acts as a solvent for the phthalein-pH indictor, and the viscosity of the coloring ink is controlled.

The surface active agent acts as binder, and the adhesive property between phthalein pH-indicator and the paper is improved.

And also, the surface active agent prevents the printed ink surface from waving like stripping, by centrifugal effect of high speed printing, as a result, printing uniformity is improved.

Rust inhibitors such as hydrophilic rust inhibitors commonly known in the art such as fatty acid ester materials, for example, sorbitan fatty acid ester, can be used in the present invention.

The structure of alkylamineoxide is as follows:

The structure of alkylaryl-sulfonamide is as follows:

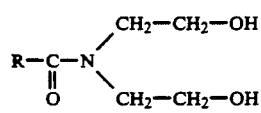

The structure of sodium alkylether-sulfate ester is as follows:

The structure of α-olefinsulfonate sodium is as follows:

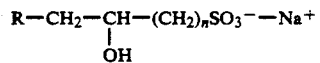

wherein n is selected from the group consisting of zero and a positive integer.

Furthermore, when a mixture blended by sodium alkylethersulfate ester, α-olefinsulfonate sodium, alkylarylsulfonateamide, and alkylamideoxide at same ratio is used as the surface active agent, not only the color changing with the passage of time is prevented, but also perfect invisible printing at the colorless state is possible.

And by using the involatile acidic substance, such as citric acid, the phthalein pH-indicator is maintained into the acidity stage, as a result, stability of colorless state at the usual condition is improved.

And rust-preventives prevents the printing machine from rusting as occasioned by using such an acidity coloring ink.

As utensiles for making the coloring assistant act on the printed matters, excepting what is called a felt pen, there are pen types such as markers for underlining which are provided at their points with, for example, acryl tips or polyester tips. It is also, good to apply the coloring assistant by means of containers being equipped at their heads with sponge-like applying utensiles or sprays, or by using a brush, a rubber, a sponge roller, and the like after filling up any vessels with it.

The printed body can be used in different forms and for various purposes such as, for example, books, newspapers, weekly publications, pamphlets or catalogues, and also solid things like packing boxes, terrestial globes or others. The qualities of the materials of the printed body run the whole gamut of papers: machine-made paper (fine, medium, and rough) of European style or handmade paper of Japanese style, etc. Fine paper or medium-quality paper are preferable for the purpose of increasing the number of times of the repeated use, and yet it is recommended to select taking in consideration which sort of paper will be most payable, and so on. It is possible to print in the same manner not only on paper but also on textile products, wood, and others. The printing can be made by various printing techniques, such as surface printing, photogravure, or mimeographing, offset (inclusive of dry offset), and others.

On the other hand, the printed body can be printed invisible on part or the whole of it which is to be being abreast of the visible part printed with, for example, black ink. Further, the question-setting space such as a part requiring to print questions or notes is printed visibly, while the spaces for notes serving as the spaces for answers are printed invisibly using the coloring agent-containing ink according to the invention.

Such an invisible space as printed in this way develops color by making the coloring assistant act thereon and becomes visible, when it loses color in a short time by the losing effect of the coloring assistant with the passage of time. However, this invisible part does the short-time fading over and over again each time when making the coloring assistant act thereon repeatedly.

As described above, the printed matters according to the invention develops color by the action of the coloring assistant, and, after having developed color, loses color in a short time. This coloring and fading can be done repeatedly when necessary. Therefore, when the printed matters according to the invention are utilized as various kinds of teaching materials wherein the spaces for notes serving as the spaces for answers are printed as the invisible printed parts abrease of the visible spaces for questions, those spaces for notes emerges into view by making the above-mentioned coloring assistant act thereon and thereby the answers is able to be easily recognized. As a result, the study can be prosecuted without interrupting the stream of exercise, when the change in color from the coloring state to the fading state absorbs increasingly the interest of the exerciser, wherefore the learning may be protected from getting into a monotone. What is more, because the spaces for answers lose color in a short time after once having developed color, the excerciser can try the solution of problems over and over again with a state of not turning his eyes toward the spaces for answers. Further, it becomes also possible for the purpose of learning a language to omit the labor to consult this or that dictionary by making the note space containing translated passages, parts with notes or others of various readings of foreign languages, for example, English newspapers or overseas weekly publications be printed visibly beforehand, and by making them develop color visibly at any time when being desired, thereby displaying a great deal of effectiveness in studying languages, such as the increase in the amount of readings in leaps and bounds, and contributing to the elevation of the liguistic ability.

EXAMPLE 1

Description will be done taking the case where the printed matter according to the invention is used in the reference book of study shown in FIG. 1(a). The question-setting space a was printed using the ink containing an ordinary black pigment, and the letters printed at its side, that is, the notes space for answers (b) was printed at its right side by using the coloring agent-containing ink according to the invention so as to be usually invisible. The printing was carried out on a movable-type printing machine, and the paper used was of fine quality. The coloring ink was made as having the following composition:

| O-cresol phthalein | 12 parts |
| surface active agent belong to the group of higher alcohol | 40 parts |
| surface active agent belong to the group of fatty acid | 25 parts |
| Triethanol amine | 15 parts |
| glue | 0.5 parts |
| linseed oil | 5 parts |

On the other hand, the coloring assistant was prepared in the following composition:

| ammonia | 1 part |
| caustic soda | 0.2 parts |
| water | 100 parts |
| thickener | 0.5 parts |
| surface active agent | 9 parts |

Figure 1B:
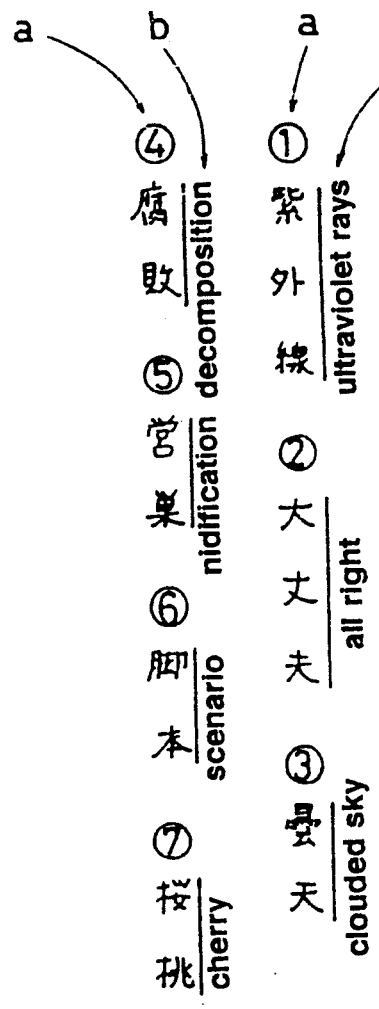
FIG. 1(b) is a top view showing a state where a color develops under the action of a coloring assistant.

The marking pen equipped with a polyester tip having at its head a chisel-cutted part was made by impregnating a core filter for the marking pen where the polyester fibre was wound by a polyethylene film, with the above solution. When the right side face from the vertical line of the question-setting space a in FIG. 1 (2) was stroked with the above-mentioned marking pen, then the letters printed at its die, that is, the notes space b turned purple, as shown in FIG. 1(b). The developed color, however, disappeared after 5 minutes, to say for the springtimes only. After once having been dried, the mutation mentioned above could be repeated for second time. Not only that, the marking pen here was able to be used thirty times repeatedly.

EXAMPLE 2

The coloring assistant was prepared in the following composition:

| 3-ethoxypropylene amine | 15 parts |
| denatured alcohol | 50 parts |
| 5%-aqueous solution of tartaric acid | 35 parts |

By making the coloring assistant act after printing, the blue color appeared and then it disappeared of itself in about 2 minutes. By the way, the printed matter produced in such a way was able to be used a number of times.

TABLE 1

| pH-indicator | amount to be added/100 g | coloring pH | fading pH | color | coloring assistants to be combined | time from coloring to fading (20° C., humidity 65% in room) |
|---|---|---|---|---|---|---|
| γ-dinitrophenol | 3 g | 5.8 | 4.0 | yellow | amine | 1 min.~1 hr. |
| p-nitrophenol | 3 g | 7.6 | 5.6 | yellow | amine ammonia | 1 min.~1 hr. |
| m-nitrophenol | 3 g | 8.4 | 5.5 | yellow | amines ammonia | 1 min.~1 hr. |
| cyanine | 4 g | 8.6 | 4.0 | blue | amines | 20 sec.~3 min. |
| α-naphtholphthalein | 2 g | 9.2 | 5.8 | blue | ammonia amines | 1 min.~2 hr. |
| ethyl bisacetic acid | 7 g | 10.5 | 7.5 | blue | ammonia amines NaOH, KOH | 10 sec.~12 hr. |

TABLE 1-continued

| pH-indicator | amount to be added/100 g | coloring pH | fading pH | color | coloring assistants to be combined | time from coloring to fading (20° C., humidity 65% in room) |
| --- | --- | --- | --- | --- | --- | --- |
| phenolphthalein | 5 g | 10.2 | 7.5 | purple-red | ammonia amines NaOH, KOH | 10 sec.~12 hr. |
| O-cresol phthalein | 5 g | 10.5 | 7.4 | crimson | ammonia amines NaOH, KOH | 1 min.~12 hr. |
| thymol phthalein | 6 g | 11.6 | 8.6 | blue | ammonia NaOH, KOH | 1 min.~12 hr. |
| bromphenol purple | 5 g | 12.2 | 7.5 | purple | ammonia NaOH, KOH | 1 min.~1 hr. |

What I claims:

1. Printed matter being printed with a coloring ink in which color is developed by interacting the ink with a coloring assistant containing a pH-adjusting agent and the color disappears by losing the pH-adjusting effect due to volatility or desiccation of the coloring assistant;

said coloring ink consisting of 5 to 20 weight % of phthalein pH-indicator and ink vehicles containing, 8 to 20 weight % of surface active agent consisting of a mixture of sodium alkylether-sulfate ester, α-olefinsulfonate sodium, alkylarylsulfonateamide, and alkylamineoxide at same ratio, 10 to 26 weight % of alkylolamide, 0.12 to 2 weight % of citric acid, 0.12 to 2 weight % of rust preventives, and water as remainder.

2. Printed matters as set forth in claim 1, which is characterized in that said pH-adjusting agent which loses effect due to the volatility is either one sort or a mixture of plural sorts being selected from the group consisting of ammonia, monoethanol amine, a class of ethyl amines, a class of propyl amines, 2 ethylhexyloxypropyl amine, 3-ethoxypropyl amine, 3-methoxypropyl amine, diisobutyl amine, sec-butyl amine, and a class of ethylene amine.

3. Printed matters as set forth in claim 1, which is characterized in that said pH-adjusting agent that loses effect due to the evaporation is either one sort or a mixture of plural sorts being selected from the group consisting of diisopropanol amine, and diethanol amine.

4. Printed matters as set forth in claim 1, which is characterized in that said coloring assistant has within itself an acidic substance.

5. Printed matters as set forth in claim 4, which is characterized in that said acidic substance is a mixture of one having a volatile property and one having an involatile property.

6. Printed matter as set forth in claim 5, which is characterized in that said volatile acidic substance loses effect later than an alkaline pH-adjusting agent.

7. Printed matters as set forth in claim 1 wherein said color ink is characterized by having within itself an acidic substance acting as a pH-adjusting agent.

8. Printed matters as set forth in claim 7, which is characterized in that said pH-adjusting agent is either one sort or a mixture of plural sorts being selected from the groups consisting of tartaric acid and citric acid.

* * * * *